Sept. 24, 1940.                B. DICK                2,215,546
                        SPRING-APPLIED BRAKE
                         Filed May 20, 1939

INVENTOR
BURNS DICK

BY
E. E. Huffman

ATTORNEY

Patented Sept. 24, 1940

2,215,546

UNITED STATES PATENT OFFICE 2,215,546

SPRING-APPLIED BRAKE

Burns Dick, Ferguson, Mo., assignor to Wagner Electric Corporation, St. Louis, Mo., a corporation of Delaware Application May 20, 1939, Serial No. 274,691

14 Claims. (Cl. 188—170)

My invention relates to brakes and more particularly to a brake in which the friction element thereof is spring-applied.

One of the objects of my invention is to produce an improved brake which is applied by a spring and released by fluid pressure.

Another object of my invention is to so embody the applying spring in a brake of the type referred to that the spring may be easily compressed and mounted in operative position during assembly of the brake.

Still another object of my invention is to so associate the brake applying spring with the brake releasing fluid motor that the resulting construction will be such that it can be easily incorporated in a brake assembly which has been designed to be normally released and applied by a fluid motor.

Figure 1:
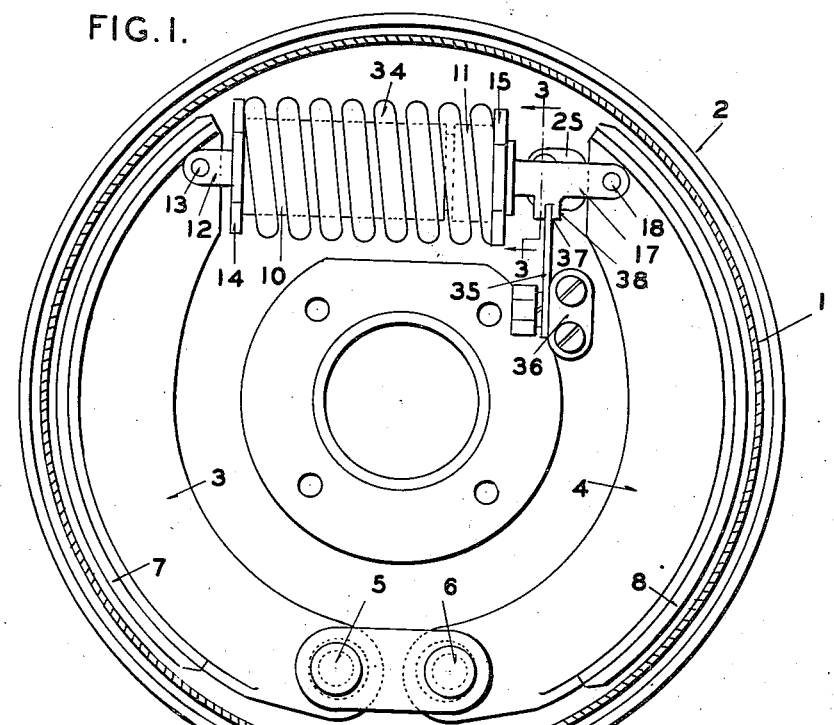
Figure 2:
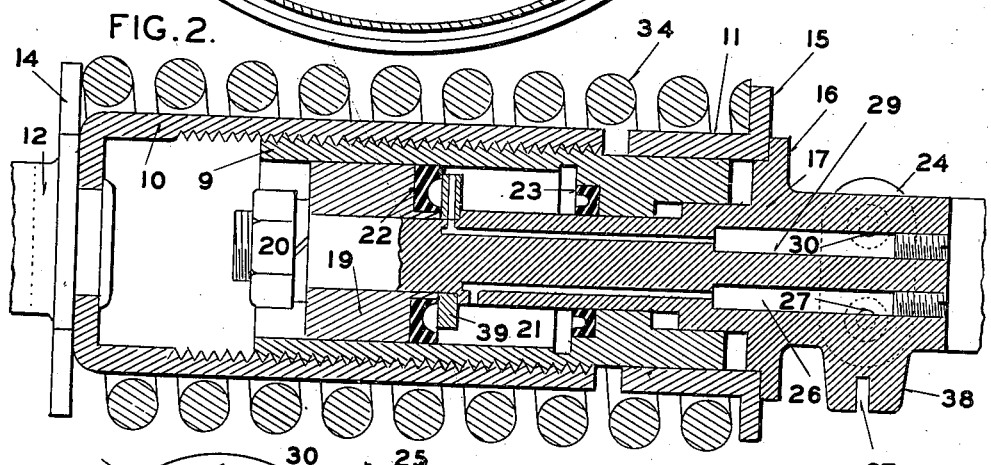
Figure 3:
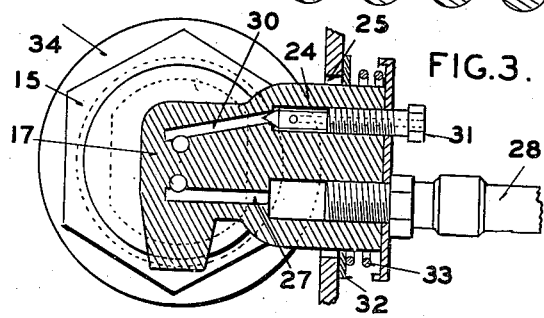

Other objects of my invention will become apparent from the following description taken in connection with the accompanying drawing in which Figure 1 is a side view of a brake, showing my invention embodied therein; Figure 2 is a longitudinal cross-sectional view of the fluid motor and associated brake applying spring; and Figure 3 is a cross-sectional view taken on the line 3—3 of Figure 1.

Referring to the drawing in detail, numeral 1 indicates a drum fixed to a rotatable member such as a shaft, and numeral 2, a backing plate or support secured to some fixed member as is common practice. Within the drum are two brake shoes 3 and 4 mounted upon adjustable anchor pins 5 and 6 carried by the backing plate. The shoes carry the usual friction lining 7 and 8.

In accordance with my invention, I employ a cylinder 9 provided with external threads for cooperation with an internally threaded sleeve 10. Upon cylinder 9 is slidably mounted a second sleeve 11 which is prevented from relative rotation with respect to the cylinder by cooperating flat surfaces between the sleeve and the cylinder. The sleeve 10 is secured to an attaching member 12 for connecting it to the end of shoe 3 by a pin 13. This attaching member is provided with a hexagonal-shaped flange 14 whereby sleeve 10 may be screwed on or off the cylinder 9 by a suitable wrench. The sleeve 11 is also formed with a hexagonal-shaped flange 15 for receiving a suitable wrench to hold the cylinder from turning when sleeve 10 is screwed on or off the cylinder.

The flange portion 15 of sleeve 11 abuts a flange 16 on a piston rod 17 which has one end extending into the cylinder through the end wall thereof and the other end pivotally connected to the end of shoe 4 by means of a pin 18. The inner end of the piston rod has mounted thereon a piston 19 positioned in the cylinder and held on the rod by means of a nut 20. This piston forms with the cylinder and the end wall thereof, a fluid receiving chamber 21 which is sealed by a cup 22 cooperating with the piston and a cup 23 cooperating with the end wall of the cylinder and the piston rod. The piston rod, externally of the cylinder, is provided with a lateral extension 24 projecting through a suitable enlarged opening 25 to the exterior of the backing plate as best shown in Figure 3. Fluid is adapted to be forced into chamber 21 by way of a longitudinal passage 26 in the piston rod and a communicating cross passage 27 in the projection 24. A conduit 28 connected to the projection places the passage 27 in communication with a suitable source of pressure such as a master cylinder (not shown). In order to bleed the chamber, the piston rod 17 is also provided with a longitudinal passage 29 in communication with chamber 21 and connecting this passage with the atmosphere is a passage 30 closed by a screw-plug 31. The enlarged opening 25 through which projection 24 extends is closed by a washer 32 held against the surface of the backing plate by means of a spring 33.

In order that the brake shoes may be applied to the drum, there is provided a strong coil spring 34 which is mounted in surrounding relation to cylinder 9 and the sleeves 10 and 11 with its ends in abutting relation with the hexagonal flanges 14 and 15. The spring is at all times under compression, thus expanding the ends of the shoes against the drum through the medium of the connecting member 12 and the piston rod 17. The shoes are held in a central position when they are disengaged from the drum by a leaf spring 35 one end of which is bolted to the backing plate by a bracket 36 and the other end of which extends into a notch 37 in a downwardly extending portion 38 of the piston rod.

The operation of the above described brake is believed to be obvious. The shoes will be held in engagement with the drum by the strong spring 34. When it is desired to release the shoes, fluid under pressure is forced into chamber 21, thereby compressing the spring and moving the shoes to their retracted positions where they are out of engagement with the drum.

The construction just described is such as to permit easy installation of the strong spring 34 when the brake is assembled. The spring, when in its uncompressed condition, is first mounted upon cylinder 9 with one end against the hexagonal flange of the sleeve 11. Next, sleeve 10 is inserted in the other end of the spring and screwed on the cylinder. During this screwing operation piston 19 will be in abutting relation with the closed end of the cylinder. To protect the cup 22, a washer 39 is secured on the piston rod ahead of the cup. The screwing operation may be easily performed by suitable wrenches cooperating with the hexagonal flanges 14 and 15 of sleeves 10 and 11. When the spring is compressed the proper amount, the attaching member 12 is connected to shoe 3 and then fluid under pressure is forced into chamber 21 to thereby move the piston and cylinder in opposite directions and to such an extent that the spring will be so compressed that the shoes can be placed in the drum. The construction is compact and very little space is employed to mount the spring in the assembly since it surrounds the cylinder of the fluid motor. Also, the arrangement is such that the spring and fluid motor assembly can be substituted for the usual fluid motor in a brake assembly which has been designed to be normally released and applied only by a fluid motor. To accomplish this substitution, all that is necessary is to cut off a portion of the toe of each shoe and then attach member 12 to shoe 3 and the piston rod 17 to shoe 4.

The brake has been found to be very useful in the control of cranes and hoists where it is desired to have the brake shoes normally held applied and released only during short intervals.

Being aware of the possibility of modifications within the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a rotatable drum, a friction element for cooperation with the drum and having adjacent ends, a coil spring interposed between the ends of the friction element for actuating said ends into engagement with the drum, said spring having its axis positioned at right angles to a radius of the drum, abutments operatively connected to the ends of the spring, and engaged by the ends of the spring, and means positioned within the coils of the spring for moving said abutments toward each other to compress the spring.

2. In braking apparatus, a rotatable drum, a friction element for cooperation with the drum, a coil spring for actuating the friction element into engagement with the drum, and a fluid motor positioned within the coils of the spring for compressing the spring and causing the friction element to be disengaged from the drum.

3. In braking apparatus, a support, a rotatable drum, a friction element for cooperation with the drum and having adjacent ends, spaced abutments associated with the ends of the friction element, a coil spring interposed between said abutments for forcing the ends of the friction element into engagement with the drum, floating means for moving said abutments toward each other to compress the spring and cause the friction element to be disengaged from the drum, and yieldable means for maintaining the floating means and the ends of the friction element from moving relative to the support when said friction element is disengaged.

4. In braking apparatus, a rotatable drum, a friction element for cooperation with the drum, a coil spring for actuating the friction element into engagement with the drum, a floating fluid motor positioned within the coils of the spring for compressing the spring and causing the friction element to be disengaged from the drum, and yieldable means for preventing the ends of the friction element and the fluid motor from shifting with respect to the support when the friction element is disengaged from the drum.

5. In braking apparatus, a support, a rotatable drum, a friction element for cooperation with the drum, a coil spring for actuating the friction element into engagement with the drum, a fluid motor positioned within the coils of the spring for compressing the spring and causing the friction element to be disengaged from the drum, and a leaf spring secured to the support and cooperating with an element of the fluid motor for yieldably holding the fluid motor from movement with respect to the support when the friction element is disengaged from the drum.

6. In braking apparatus, a rotatable drum, a friction element for cooperation with the drum and having adjacent ends, a cylinder connected to one end of the friction element, a piston connected to the other end of the friction element, means forming a fluid chamber between the piston and cylinder whereby fluid under pressure therein will cause the cylinder and piston to move in such opposed directions as to move the ends of the friction element away from the drum, and a coil spring surrounding the cylinder for forcing the ends of the friction element into engagement with the drum.

7. In braking apparatus, a rotatable drum, a friction element for cooperation with the drum and having adjacent ends, a cylinder connected to one end of the friction element, a piston rod connected to the other end of the friction element and extending into the cylinder, a piston secured to the rod and positioned in the cylinder, means including the piston and the cylinder for forming a fluid pressure chamber between the piston and the end of the cylinder through which the piston rod extends, spaced abutments carried by the cylinder and piston rod, and a coil spring surrounding the cylinder and compressed between the abutments.

8. In braking apparatus, a rotatable drum, a friction element for cooperation with the drum and having adjacent ends, a cylinder connected to one end of the friction element, a piston rod connected to the other end of the friction element and extending into the cylinder, a piston secured to the rod and positioned in the cylinder, means including the piston and the cylinder for forming a fluid pressure chamber between the piston and the end of the cylinder through which the piston rod extends, spaced abutments carried by the cylinder and piston rod, a coil spring surrounding the cylinder and compressed between the abutments, and means for adjusting one of said abutments relatively to the member on which it is carried.

9. In braking apparatus, a support, a rotatable drum, a friction element for cooperation with the drum and having adjacent ends, a cylinder connected to one end of the friction element, a piston in the cylinder and connected to the other end of the friction element, means forming a fluid chamber between the piston and cylinder whereby fluid under pressure therein will cause the cylinder and piston to move in such opposed directions as to move the ends of the friction element away from the drum, a coil spring surrounding the cylinder for forcing the ends of the friction element into engagement with the drum, and a leaf spring secured to the support and cooperating with the cylinder and piston assembly for yieldably holding said assembly from movement with respect to the support when the friction element is disengaged from the drum.

10. In braking apparatus, a rotatable drum, a friction element for cooperation with the drum and having adjacent ends, an externally threaded cylinder, means for connecting said cylinder to one end of the friction element and comprising an internally threaded sleeve cooperating with the cylinder, a piston rod connected to the other end of the friction element and extending into the cylinder, a piston connected to the piston rod, means forming a fluid chamber between the piston and cylinder whereby fluid therein is placed under pressure and the cylinder and piston will be moved in such opposed directions that the ends of the friction element will be moved away from the drum, an abutment associated with the threaded sleeve, a second abutment associated with the piston rod, and a coil spring surrounding the cylinder and interposed between said abutments.

11. In braking apparatus, a rotatable drum, a friction element for cooperation with the drum and having adjacent ends, an externally threaded cylinder, means for connecting said cylinder to one end of the friction element and comprising an internally threaded sleeve cooperating with the cylinder, a piston rod connected to the other end of the friction element and extending into the cylinder, a piston connected to the piston rod, means forming a fluid chamber between the piston and cylinder whereby fluid therein is placed under pressure and the cylinder and piston will be moved in such opposed directions that the ends of the friction element will be moved away from the drum, an abutment associated with the threaded sleeve, a second abutment associated with the piston rod, a coil spring surrounding the cylinder and interposed between said abutments, and cooperating means between the piston and cylinder for limiting their extent of movement under the action of the spring and permitting the compression of said spring by relative rotation between the sleeve and the cylinder.

12. In braking apparatus, a rotatable drum, a friction element for cooperation with the drum and having adjacent ends, a cylinder connected to one end of the friction element, a piston rod connected to the other end of the friction element and extending into the cylinder, a piston secured to the rod and positioned in the cylinder, means including the piston and the cylinder for forming a fluid pressure chamber between the piston and the end of the cylinder through which the piston rod extends, means providing passages in said piston rod for connecting the chamber to a source of pressure and for bleeding said chamber, spaced abutments carried by the cylinder and piston rod, and a coil spring surrounding the cylinder and compressed between the abutments.

13. In braking apparatus having a friction device provided with adjacent expansible ends, a unitary control device for interposition between said ends of the friction device and comprising spaced abutments, means for connecting one abutment with one end of the friction device and the other abutment with the other end of the friction device, a coil spring positioned between the abutments, and means comprising a fluid motor positioned within the coils of the spring for moving the abutments toward each other to compress the spring and cause the ends of the friction device to be disengaged from the drum.

14. In braking apparatus, a rotatable drum, a friction device for cooperation with the drum and having adjacent ends, two spaced abutments each operatively connected with an end of the friction device and movable therewith, a coil spring interposed between said abutments for forcing the ends of the friction device into engagement with the drum, and means for moving both said abutments toward each other to compress the spring and cause the friction device to be disengaged from the drum, said means comprising a fluid motor having two movable elements and a fluid pressure receiving chamber therebetween, means for connecting one of the elements to one abutment, and means for connecting the other abutment to the other elements, said connections being such that when fluid under pressure greater than atmospheric pressure is received in the chamber the elements will be moved apart and the abutments moved toward each other to compress the spring.

BURNS DICK.